United States Patent [19]

Sueta

[11] Patent Number: 4,692,691

[45] Date of Patent: Sep. 8, 1987

[54] TEST SYSTEM FOR KEYBOARD INTERFACE CIRCUIT

[75] Inventor: Yoshihisa Sueta, Fujisawa, Japan

[73] Assignee: Internatinal Business Machines Corporation, Armonk, N.Y.

[21] Appl. No.: 806,077

[22] Filed: Dec. 5, 1985

[30] Foreign Application Priority Data

Dec. 14, 1984 [JP] Japan ................................ 59-263156

[51] Int. Cl.⁴ ............................................ G01R 31/28
[52] U.S. Cl. ............................ 324/73 R; 324/158 R; 371/20; 371/25
[58] Field of Search ............ 324/73 R, 73 AT, 158 R; 371/25, 24, 20

[56] References Cited

U.S. PATENT DOCUMENTS 4,435,806  3/1984  Segers et al. .................. 324/73 AT
4,500,836  2/1985  Staudacher .................... 324/73 AT
4,503,387  3/1985  Rutledge et al. .............. 324/73 AT Primary Examiner—Reinhard J. Eisenzopf
Assistant Examiner—Vinh P. Nguyen
Attorney, Agent, or Firm—Joseph J. Connerton; Frederick D. Poag

[57] ABSTRACT

A test system of this invention is capable of distinguishing interface circuit trouble from keyboard trouble. For diagnosis, an inhibit signal is generated to supply a test clock signal to an output shift register and an input shift register of the interface circuit instead of a clock signal generated from the keyboard, and test data are loaded into the output shift register. If the test data are transferred from the output shift register to the input shift register correctly, it is detected that the interface circuit does not have trouble.

4 Claims, 3 Drawing Figures

TEST SYSTEM FOR KEYBOARD INTERFACE CIRCUIT

BACKGROUND OF THE INVENTION

1. Field of the Invention

This invention relates to a keyboard interface circuit, and more particularly a test system for testing such a circuit.

2. Prior Art

As shown in FIG. 3, a conventional keyboard interface circuit 2 comprises an input shift register 8 which stores data signals from a keyboard 4 and outputs them to a microprocessor 6 after shifting the signals responsive clock signals from the keyboard 4, and an output shift register 10 which stores data signals to be supplied from the microprocessor 6 to the keyboard 4 and outputs them to the keyboard 4 according to the clock signals from the keyboard 4. Existence of trouble in the keyboard 4 or the interface circuit 2 is determined by observing whether or not predetermined data entered from the keyboard 4 reach the microprocessor 6.

The above-described conventional testing method has a shortcoming in that, if the entered data from the keyboard 4 fails to reach the microprocessor 6, it is impossible to determine whether the trouble is in the interface circuit 2 or the keyboard 4.

SUMMARY OF THE INVENTION

An object of this invention is to provide a test system which is capable of distinguishing in keyboard interface circuit trouble from keyboard trouble.

To achieve said object, the invention comprises a means connecting, for at least a test period, the input of a first shift register (corresponding to the above-mentioned input shift register), which normally receives data signals from a keyboard and supplies them to another device such as a microprocessor to the output of a second shift register (corresponding to above-mentioned output shift register), which normally supplies the data signals to the keyboard, means for generating inhibit signals when testing, means for generating test clock signals, a clock switching means responsive to the inhibit signals to supply test clock signals to the first and second shift registers instead of clock signals from the keyboard, means responsive to the inhibit signals for inhibiting the data signals from being supplied from the keyboard to the first shift register, means for supplying test data signals to the second shift register, and means comparing signals being outputted from the first shift register with the test data signals supplied to the second shift register.

During testing, the first and second shift registers of the keyboard interface circuit are not supplied with data and clock signals from the keyboard. Instead, both registers are supplied with test clock signals from an external source, and the second shift register is supplied with test data signals. That is, the output of the second shift register is directly entered into the first shift register. If the output signals from the first shift register do not match the original test data signals, it is judged that the interface circuit has trouble.

DETAILED DESCRIPTION

Figure 2:
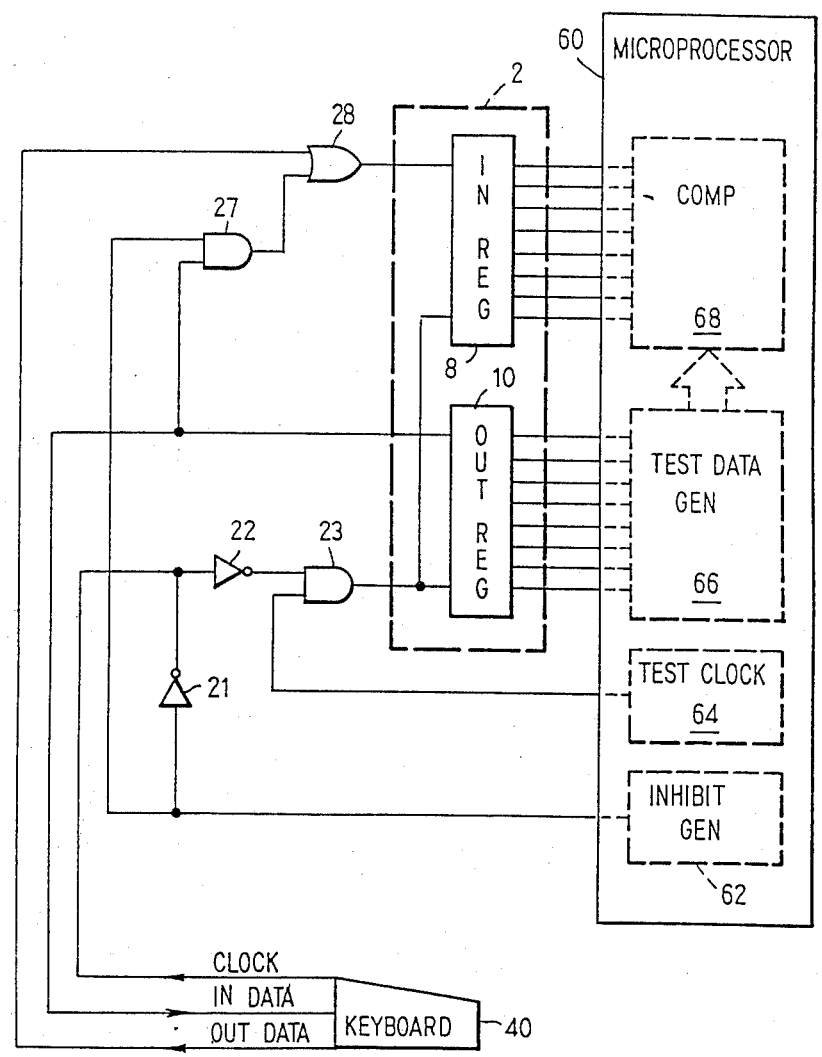
FIG. 2 is a block diagram showing another embodiment of a test system for a keyboard interface circuit.
Figure 3:
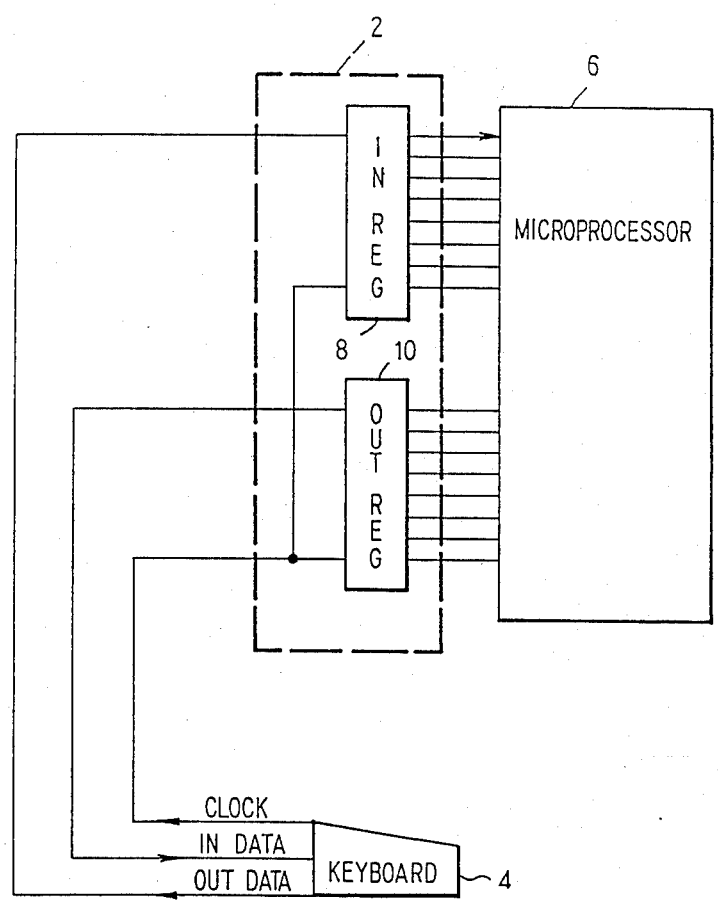
FIG. 3 is a block diagram showing a conventional keyboard interface circuit.

FIG. 2 shows an embodiment of the invention. In this embodiment, output data signals of the keyboard 40 are supplied to the input terminal of a serial-parallel converting input shift register 8 of the interface circuit 2 through OR gate 28. Clock signals being outputted from the keyboard 40 are inverted by an inverter 22, and supplied to the input terminals of AND gate 23. The input terminal of inverter 22 is connected to an output terminal of inverter 21. Although the open collector of inverter 21 transfers the clock signals being outputted from the keyboard 40 if input signals (voltage) to the collector are at a low level, it maintains output signals (voltage) at a low level if the input signals are at a high level, and prevents clock signals output from the keyboard 40 from transferring to the inverter 22.

An inhibit signal generating means 62 consisting of hardware and programs of the microprocessor 60 supplies input signals to the open collector of inverter 21. The generating means 62 provides inhibit signals of high level to the open collector of inverter 21 during testing of the interface circuit 2, and inhibits the clock signals output from the keyboard 40 from being supplied to the input and output registers 8 and 10. The keyboard 40 is arranged to stop generating of output data when signals (voltage) at the output terminal of clock or those of inverter 21 are maintained at a low level for a predetermined period or more. This is easily accomplished by combination of a timer and a switch. In normal operation, the inhibit signal generating means 62 generates low level signals, allowing transfer of the clock signals output from the keyboard 40 to the inverter 22.

Another input terminal of AND gate 23 is connected to a test clock 64 which is constituted by the hardware and program of microprocessor 60. The test clock 64 generates test clock signals as clock signals for shifting the input and output shift registers 8 and 10 when testing of the interface circuit 2, and generates high level signals in the normal operation to allow the clock signals output from the keyboard 40 to be supplied to the input and output shift registers 8 and 10 through the AND gate 23. As seen from the above description, the open collector of inverter 21, the inverter 22 and the AND gate 23 constitute a means for switching the clock signals output from the keyboard 40 and the test clock signals output from the test clock 64.

The parallel input terminals of a parallel-serial converting output shift register 10 of the interface circuit 2 are connected to the microprocessor 60, while its serial output terminal is connected to the data input terminal of keyboard 40 and one of the input terminals of AND gate 27. Another input terminal of AND gate 27 is connected to the inhibit signal generating means 62, and its output terminal is connected to the other input terminal of OR gate 28. The output shift register 10 is provided with various commands such as request for retransmission from the microprocessor 60 in the normal operation, and, when testing of the interface circuit 2, with test data from a test data generating means 66 which is constituted by the hardware and program of microprocessor 60. A comparison means 68 constituted by the hardware and program of microprocessor 60 is arranged to compare data being outputted from the test data generating means 66 when testing with data which is returned through the output shift register 10 and the input shift register 8.

Now, description is made on the operation of the embodiment of FIG. 2 thus constituted. In the normal operation, the inhibit signal generating means 62 and the test clock 64 generate low and high level signals, respectively. Therefore, the clock signals being outputted from the keyboard 40 are supplied to the clock terminals of the input and output shift registers 8 and 10 through the inverter 22 and the AND gate 23. Thus, data being outputted from the keyboard 40 is supplied to the microprocessor 60 after serial-parallel conversion in the input shift register 8 according to the clock signals of the keyboard. On the other hand, the data output from the microprocessor 60 is supplied to the keyboard 40 after parallel-serial conversion in the output shift register 10. Since the AND gate 27 is supplied with low level signal from the inhibit signal generating means 62, the output signal in output shift register 10 is not provided to the input shift register 8.

When testing the keyboard interface circuit 2, the inhibit signal generating means 62 generates high level inhibit signals. This makes the output side of inverter 21 low level. The keyboard 40 stops outputting of data by detecting that the output signals at the clock output terminal are low level for a predetermined period. On the other hand, the test clock 64 supplies test clock signals to one of the input terminals of AND gate 23. Since the other input terminal of AND gate 23 is supplied with high level signals from the inverter 22, the test clock signals are supplied to the clock terminals of input and output shift registers 8 and 10. Then, the test data generating means 66 provides test data to the output shift register 10. The output shift register 10, if there is no trouble, converts the test data from parallel to serial form according to the test clock signals, and outputs them to one of the input terminals of AND gate 27. Since the other input terminal of AND gate 27 is supplied with high level inhibit signals, the output signals of the output shift register 10 are supplied to the serial input terminal of input shift register through the AND gate 27 and the OR gate 28. The input shift register, if there is no trouble, converts the test data from serial to parallel form according to the test clock signals, and provides them to the comparison means 68 of microprocessor 6. The means 68 compares the output signals of input shift register 8 with the output signals of the test data generating means 66. If the comparison means generates matching signals, it is judged that the interface circuit 2 has no trouble. If the comparison means generates nonmatching signals, it is judged that the interface circuit 2 has some trouble.

Figure 1:
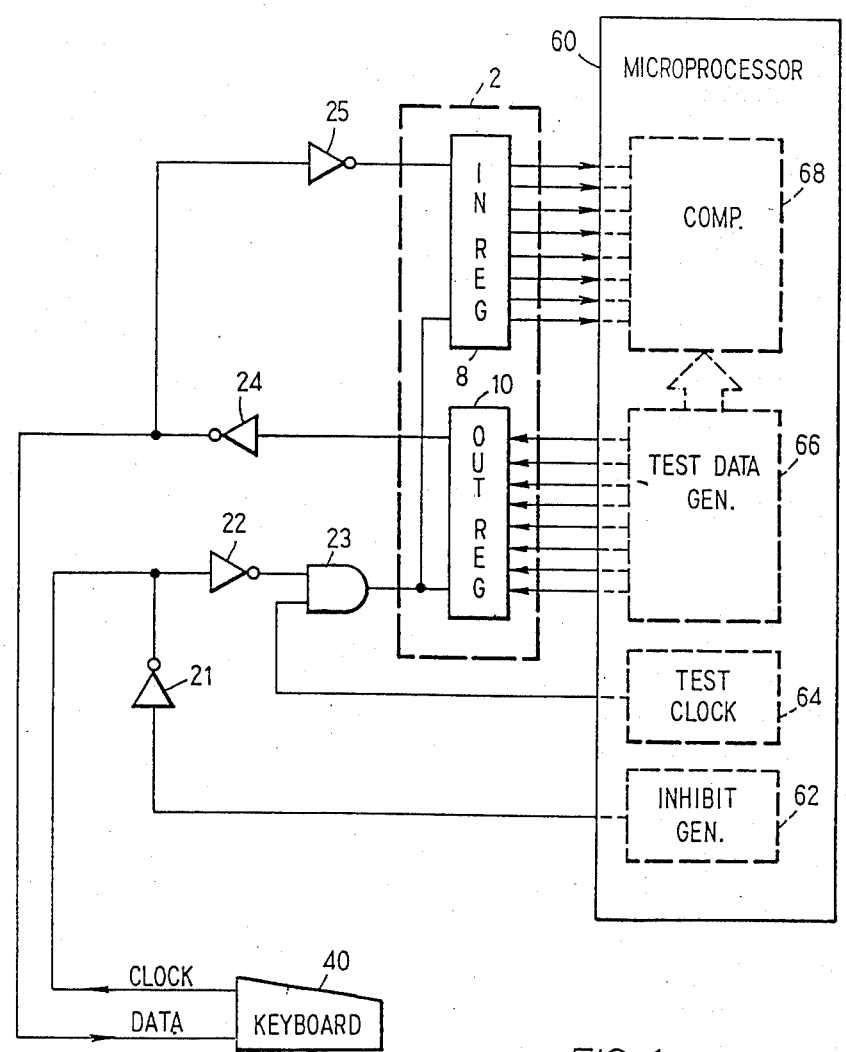
FIG. 1 is a block diagram showing an embodiment of a test system for a keyboard interface circuit.

FIG. 1 shows another embodiment of the invention. In this embodiment, the serial output terminal of the output shift register 10 is connected to an input terminal of an open collector 24, an output terminal of which is connected to the data terminal of keyboard 40 and to the serial input terminal of the input shift register 8 through the inverter 25, so that the keyboard has a common input/output line instead of separate lines. The reason of provision of the open collector 24 is that data from the microprocessor 60 have priority, if data are is inputted from the keyboard 40 and the microprocessor 60 simultaneously. That is, when the keyboard 40 and the output shift register 10 generate high level signals simultaneously, the output of open collector 24 becomes low level, and the data from the output register 10 or the microprocessor 60 have priority. Then, the keyboard 40 stops generating of data by detecting that the signal level at the data terminal is low although the keyboard 40 wants to generate high level signals.

Since the open collector 24 does not forcedly make the output signals (voltage) of keyboard 40 low level if the output signals of output register 10 are at low level, the output data of keyboard 40 is supplied to the input register 8 through inverter 25. Because the components of the embodiment of FIG. 1 having like reference numerals to those of embodiment in FIG. 2 have the same construction and functions to the corresponding components in FIG. 2, their description is not repeated here.

When testing, the inhibit signal generating means 62 generates high level signals. This makes the output of open collector 21 low level, and the keyboard 40 stops generating of data by detecting that the output signals of clock terminal are low level for a predetermined period. On the other hand, the test clock 64 supplies test clock signals to the input and output shift registers 8 and 10 through the AND gate 23, and the test data generating means 66 supplies test data signals to the parallel input terminal of output shift register 10. The output shift register, if there is no trouble, supplies the test data to the serial input terminal of input shift register 8 through the open collector 24 and the inverter 25. The input shift register 8, if there is no trouble, outputs the test data to the comparison means 68 of microprocessor 60 as they are. The comparison means 68 compares the output signals of test data generating means 66 with the output signals of input shift register 8. If the comparison means 68 generates matching signals, it is judged that the interface circuit 2 has no trouble, otherwise it is judged that there is some trouble.

The test is performed, for example, when the keyboard 40 sends only error signals, even if the microprocessor 60 sends data resending request signals to the keyboard several times, but, of course, is not limited to such errors.

Since, in the embodiment of FIG. 1, data being sent from the microprocessor 60 to the keyboard 40 in the normal operation are supplied to the input shift register 8 through the inverter 25, and then returned to the microprocessor 60, it is required to distinguish data output from the microprocessor 60 from the output from the keyboard 40, for example, by attaching a flag to their top indicating that the data is outputted from the microprocessor 60.

In addition, although, in the above-described embodiments, supplying output data to the input register 8 from the keyboard 40 is inhibited by stopping generation of data from the keyboard 40 when it is detected that the signal level at the clock terminal of keyboard 40 is maintained at low level over a predetermined period, it may be possible to inhibit output data signals of keyboard 40 from being supplied to the input shift register 8 by ANDing the output data signals of keyboard 40 and the inverted inhibit signals.

Furthermore, although, in the above-described embodiments, the inhibit signal generating means 62, the test clock 64, the test data generating means 66 and the comparison means 68 are constituted by combination of hardware and programs of the microprocessor 60, it may be possible to constitute them with hardware that is completely different from the microprocessor.

In addition, although, in the above-described embodiments, the interface circuit is constituted by the serial-parallel and parallel-serial converting shift registers, the invention is not limited to them, but may be applied to interface circuits that are constituted by various shift registers such as serial-in/serial-out or parallel-in/parallel-out.

As clearly seen from the above description, the invention performs the test of the keyboard interface circuit without using data and clock signal outputs from the keyboard, so that it can detect whether the trouble lies in the keyboard interface circuit or of the keyboard.

What is claimed is:

1. A test system for identifying an error condition between a keyboard interface and a processor comprising, in combination,
    a first shift register for storing, shifting and outputting coded data signals generated by said keyboard,
    a second shift register for storing, shifting and inputting coded data signals to be supplied to said keyboard,
    clock means for generating first and second timing signal sequences to facilitate operation of said first and second shift registers,
    means connecting the output of said second shift register to the input of said first shift register,
    said test system having an operating sequence comprising means for generating a test clock signal sequence and an inhibit signal sequence,
    clock switching means responsive to said inhibit signal sequence for inhibiting said first timing signal sequence being applied from said keyboard to said first and second shift registers and for applying said test clock signal sequence to said first and second shift registers,
    means responsive to said inhibit signal sequence for inhibiting coded data signals being applied from said keyboard to said first shift register, and
    comparison means for comparing said test clock signal sequence applied to said second shift register with the output signals from said first shift register to identify an error condition associated with said first and second shift registers.

2. A device of the character claimed in claim 1 wherein said keyboard comprises said clock means for generating a first timing signal sequence.

3. A system in accordance with claim 1 wherein said keyboard has a common input/output line having connection means to said first and second registers, and
    wherein said test signal sequence is conducted via said connection means from the output of said second shift register to the input of said first shift register.

4. A system in accordance with claim 1 wherein said keyboard has separate input and output lines, and said test signal sequence is conducted via a logical connection from the output of said second shift register to the input of said first shift register,
    said logical connector being under the control of said means for generating said inhibit signal sequence.

* * * * *